(12) United States Patent
Rhee et al.

(10) Patent No.: US 9,695,564 B2
(45) Date of Patent: Jul. 4, 2017

(54) SYSTEM FOR REMOVING FLOATING WASTE AND METHOD FOR REMOVING FLOATING WASTE USING THE SAME SYSTEM

(71) Applicant: Seoul National University R & DB Foundation, Seoul (KR)

(72) Inventors: Shin Hyung Rhee, Seoul (KR); Sungkeun Yoo, Chungcheongnam-do (KR); Kuikam Kwon, Seoul (KR); Yujin Lim, Gyeong-Gi Do (KR); Wooyoung Choi, Seoul (KR); Jaehyeok Choi, Gyeongsangnam-do (KR); Geuk Sang You, Seoul (KR)

(73) Assignee: SEOUL NATIONAL UNIVERSITY R & DB FOUNDATION, Seoul (KR)

( * ) Notice: Subject to any disclaimer, the term of this patent is extended or adjusted under 35 U.S.C. 154(b) by 58 days.

(21) Appl. No.: 14/824,183

(22) Filed: Aug. 12, 2015

(65) Prior Publication Data
US 2016/0281315 A1    Sep. 29, 2016

(30) Foreign Application Priority Data
Mar. 23, 2015  (KR) .......................... 10-2015-0040001

(51) Int. Cl.
*E02B 15/10* (2006.01)
*E04H 4/12* (2006.01)
*C02F 1/40* (2006.01)
*C02F 103/00* (2006.01)

(52) U.S. Cl.
CPC .......... *E02B 15/106* (2013.01); *E04H 4/1263* (2013.01); *C02F 1/40* (2013.01); *C02F 2103/007* (2013.01)

(58) Field of Classification Search
CPC ..... E02B 15/10; E02B 15/106; E04H 4/1263; C02F 2103/007
USPC .......... 210/747.6, 776, 167.1, 167.2, 170.05, 210/170.09, 170.1, 170.11, 242.1
See application file for complete search history.

(56) References Cited

U.S. PATENT DOCUMENTS

| | | | | |
|---|---|---|---|---|
| 3,578,171 A | * | 5/1971 | Usher | ................... E02B 15/106 210/776 |
| 3,831,756 A | * | 8/1974 | Bhuta | ................... E02B 15/106 210/776 |
| 3,853,767 A | * | 12/1974 | Mohn | ................... E02B 15/106 210/776 |
| 4,024,063 A | * | 5/1977 | Mori | ..................... E02B 15/106 210/242.1 |

(Continued)

FOREIGN PATENT DOCUMENTS

WO    WO/2014/061835 A1    4/2014

*Primary Examiner* — Christopher Upton
(74) *Attorney, Agent, or Firm* — Dentons US LLP

(57) ABSTRACT

Disclosed is a system for removing floating waste which includes a storage filter support that has a conical shape and tapers to a lower end thereof when it is installed for use and a storage filter that is inserted into the storage filter support from above. The system further includes a pump and an internal impeller when the system is a model to be used in water with zero velocity. Alternatively the system further includes an internal impeller and a speed increaser when the system is a model to be used in water with a velocity that is not zero. The speed increaser is installed in the storage filter support and drives the internal impeller.

7 Claims, 12 Drawing Sheets

(56) References Cited

U.S. PATENT DOCUMENTS

| | | | |
|---|---|---|---|
| 4,746,424 A * | 5/1988 | Drew | E04H 4/1263 210/167.2 |
| 5,078,863 A * | 1/1992 | Durigon | E04H 4/1263 210/242.1 |
| 6,979,401 B1 | 12/2005 | Porter | |
| 8,728,307 B2 * | 5/2014 | Iacovacci | E04H 4/1263 210/167.1 |
| 2008/0217229 A1 * | 9/2008 | Wagner | E04H 4/1263 210/170.05 |

* cited by examiner

SYSTEM FOR REMOVING FLOATING WASTE AND METHOD FOR REMOVING FLOATING WASTE USING THE SAME SYSTEM

CROSS-REFERENCE TO RELATED APPLICATION

This application claims priority to Korean Patent Application No. 2015-0040001 filed on Mar. 23, 2015 and all the benefits accruing therefrom under 35 U.S.C. §119, the contents of which are incorporated by reference in their entirety

BACKGROUND OF THE INVENTION

Field of the Invention

The present invention relates to a system for removing floating waste and, more particularly, to a system and method for removing floating waste, which can more effectively remove waste than in conventional systems.

The present invention is embodied, for example, in a water purification robot that takes advantage of natural phenomena to purify water. The water purification robot includes an impeller and a pump or speed increaser that drives the impeller. Therefore, the water purification robot is flexible in removing various kinds of pollutants from water. In addition, the water purification robot can be anchored to the bed of a river that has a large amount of floating waste, so that the water purification robot can be installed at any place. In short, the prevent invention relates to a system for easily removing floating waste and a method for easily removing floating waste using the same system.

The present invention particularly relates to a system for easily removing floating waste and a method for easily removing floating waste using the same system, in which the system includes an impeller and a pump or speed increaser that drives the impeller, is structured to be anchored to the bed of a river that has a large amount of floating waste, and a plurality of the systems may be tied to a cleaning ship using a towing rope, enabling floating waste that floats over a large area of water to be removed in relatively short time.

The present invention more particularly relates to a system for removing floating waste (also, hereinafter referred to as floating-water-removing system) and a method for removing floating waste (also, hereinafter referred to as floating-waste-removing method) using the same system, the system being structured such that: a plurality of the systems may be arranged to be tied to a cleaning ship using a towing rope so that the systems can be moved by the cleaning ship; the systems are equipped with respective storage filters, each having an inlet, an internal impeller, and a storage portion; the storage filters can be detached from respective storage filter supports mounted in the systems so that the storage filters rise to the surface of water by buoyancy when the storage filters are filled with floating waste after the systems operate for long hours while the systems are anchored to the bed of a body of water; the floated storage filters can be recovered to the cleaning ships; and the storage filters can be reused after being cleaned. The system according to the present invention enables a cleaning operation of removing floating waste from water to be continuously performed.

Description of the Related Art

People cannot live without water because water is an essential element to sustain life.

Rivers around us are not only a source of drinking water but also a base for economic activities. In addition, rivers are a tourist attraction, contributing to development of local communities.

Accordingly, managing water quality of rivers is not only beneficial to local communities but also is a way of securing life.

However, although the importance of water quality management is increasingly emphasized, the number of kinds and the amount of pollutants are increasing.

Among various kinds of pollutants, floating waste that is lighter than water and thus floats down a river is specifically posing a problem.

For reference, the amount of floating waste occurring in 2006 was six times larger the previous year's amount.

Moreover, water supply sources become full of floating waste in the rainy season every year. In order to solve this problem, the Korean government spends several tens of billions won, which is significant amount.

Furthermore, since floating waste flows with the current of a river, the floating waste continuously causes environment pollution by spreading over a large area.

That is, floating waste that remains without being collected or removed may end up polluting the entire area of a river. In greater detail, the floating waste decays in water, causing an offensive odor and forming a film on the water surface, which prevents oxygen in air from entering into the water. Therefore, the entire ecological system in the river is jeopardized.

In fact, in 2009 the Korean government implemented an extensive nation-wide measure for removing waste near rivers, and therefore the amount of waste which flowed into rivers during the year was reduced to 44% compared to that of the previous year although the rainfall recorded was higher than ever.

However, the water-cleaning effect obtained through such sporadic and temporary measures was not sustainable because such measures were performed by redundant public officers who are non-specialists in such operations.

Under the current situation in which the problem of floating waste is serious, there is no system that can continuously and consistently remove floating waste, the existence of which is affected by the surface stream of a river.

FIG. 11 is a schematic diagram illustrating an apparatus for removing floating waste from water according to a related art.

As illustrated in FIG. 11, the apparatus for removing floating waste according to the related art, disclosed in U.S. Pat. No. 6,979,401, is structured such that a pump is installed under the surface of water and draws in floating waste and water. Then, the water is drained and the floating waste is filtered out. That is, only the floating waste remains in an internal storage portion.

FIGS. 12A and 12B are schematic diagrams illustrating an apparatus for removing floating waste according to another related art.

As illustrated in FIGS. 12A and 12B, the apparatus according to the related art disclosed in PCT Patent Publication No. WO2014061835 A1 draws in a fluid in all directions to collect floating waste.

However, even with the related arts existing, there is still a need for development of a system and method of removing floating waste that accumulates in large volume in rivers.

Therefore, the present invention suggests a robot that can effectively collect and remove floating waste and a system for operating the same robot.

SUMMARY OF THE INVENTION

The present invention has been made keeping in mind the above problems occurring in the related art, and an objective of the present invention is to provide a robot that can effectively collect and remove floating waste and a system for operating the robot. More specifically, the present invention provides a system for removing floating waste and a method for removing floating waste using the same system.

According to one aspect, there is provided a system for removing floating waste, the system including: a storage filter support that has a conical shape and tapers to a lower end thereof when it is installed for use; and a storage filter that is inserted into the storage filter support from above, in which the system further comprises a pump and an internal impeller when the system is a model to be used in water with zero velocity, the pump being installed in the storage filter support in order to discharge water, the internal impeller being installed inside the storage filter in order to move floating waste to a storage portion in the storage filter. Alternatively, the system may comprise an internal impeller and a speed increaser when the system is a model to be used in water with a velocity that is not zero, instead of comprising a combination of the pump and the internal impeller, the internal impeller being installed inside the storage filter in order to move floating waste to a storage portion in the storage filter, the speed increaser being installed in the storage filter support and driving the internal impeller.

As the internal impeller rotates in the storage filter, fluid on the surface of water may be introduced into the storage filter so that floating waste that floats on the surface of the water can be removed.

When the flow velocity of the water is zero, the pump and the impeller are rotated, causing a vortex.

The system may further include a linear anchor whose upper end is fixed to the storage filter support and whose lower end is fixed to the bed of a body of water.

When the flow velocity of the water is above zero, the internal impeller installed inside the storage filter is rotated by driving force of the speed increaser, which is a driving means, thereby causing a vortex.

The system may further include an anchor whose upper end is fixed to the storage filter support and whose lower end is fixed to the bed of a body of water at two or more positions.

The anchor may be a multi-leg anchor that is fixed to the bed of the water in at least three positions.

The storage filter may include: an inlet that is positioned at the top of the storage filter and through which floating waste and debris in the water passes; and a storage portion that is filled with water right after the storage filter is installed and floats to the surface of the water by buoyancy of the floating waste when it is filled with the floating waste.

According to another aspect, there is provided a method of removing floating waste, the method including: preparing the system for removing floating waste by putting the storage filter into the storage filter support from above; tying a towing rope to one or more prepared systems; towing the one or more prepared systems using a cleaning ship; anchoring the one or more prepared systems to the bed of a body of water using the linear anchor or the multi-leg anchor; and driving the pump or the speed increaser, thereby allowing water and floating waste to be introduced into the storage filter through the inlet.

The method may further include: detaching the storage filter from the storage filter support wherein when the storage filter 100F is filled with the floating waste after long hours of operation of the prepared system; recovering the detached storage filter; and installing a new storage filter instead of the detached storage filter.

The system for removing floating waste and the method for removing floating waste using the same system according to the present invention have an advantage of efficiently collecting floating waste, thereby solving the problems of the related arts.

In addition, since the system can be anchored to the bed of a river that has a large amount of floating waste, the system can be installed at any places where a large amount of floating waste is present. Accordingly, it is possible to easily remove floating waste by using the same system.

Moreover, by using the system and method according to the present invention, it is possible to effectively remove floating water even when the floating waste is present in a large volume in many places instead of only when the floating waste is gathered at a small area.

Furthermore, since the storage filter can be detached, the storage filter can be reused after undergoing a cleaning process. That is, when the storage filter is filled with collected waste, the detached storage filter is moved to a cleaning ship and cleaned to be reused. Therefore, it is possible to reduce the cost of removing floating waste and to continuously remove floating waste without interruption.

Yet furthermore, the system and method according to the present invention can be used to remove problematic green and red algae that are present on rivers and other bodies of water. Therefore, the system and method according to the present invention has an advantage of keeping ecological systems healthy.

BRIEF DESCRIPTION OF THE DRAWINGS

FIG. 12 B is a schematic diagram illustrating a different view of an apparatus for removing floating waste according to another related art as shown in 12 A.

DETAILED DESCRIPTION OF THE INVENTION

Figure 1:
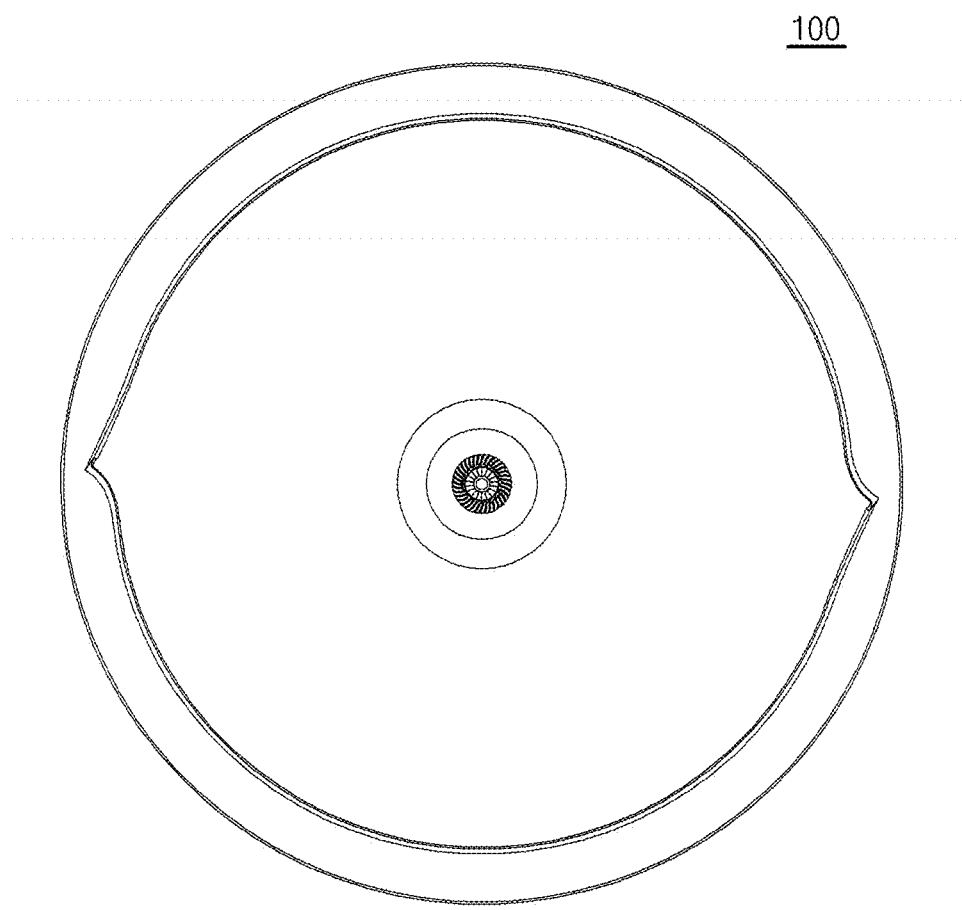
FIG. 1 is a plan view illustrating a system for removing floating waste according to an embodiment of the present invention.

Herein below, preferred embodiments of the present invention will be described in detail with reference to the accompanying drawings. In the following description of the present invention, detailed descriptions of known functions and components incorporated herein will be omitted when it may make the subject matter of the present invention unclear.

Reference will now be made in detail to various embodiments of the present invention, specific examples of which are illustrated in the accompanying drawings and described below, since the embodiments of the present invention can be variously modified in many different forms.

While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Throughout the drawings, the same reference numerals will refer to the same or like parts.

Figure 2:
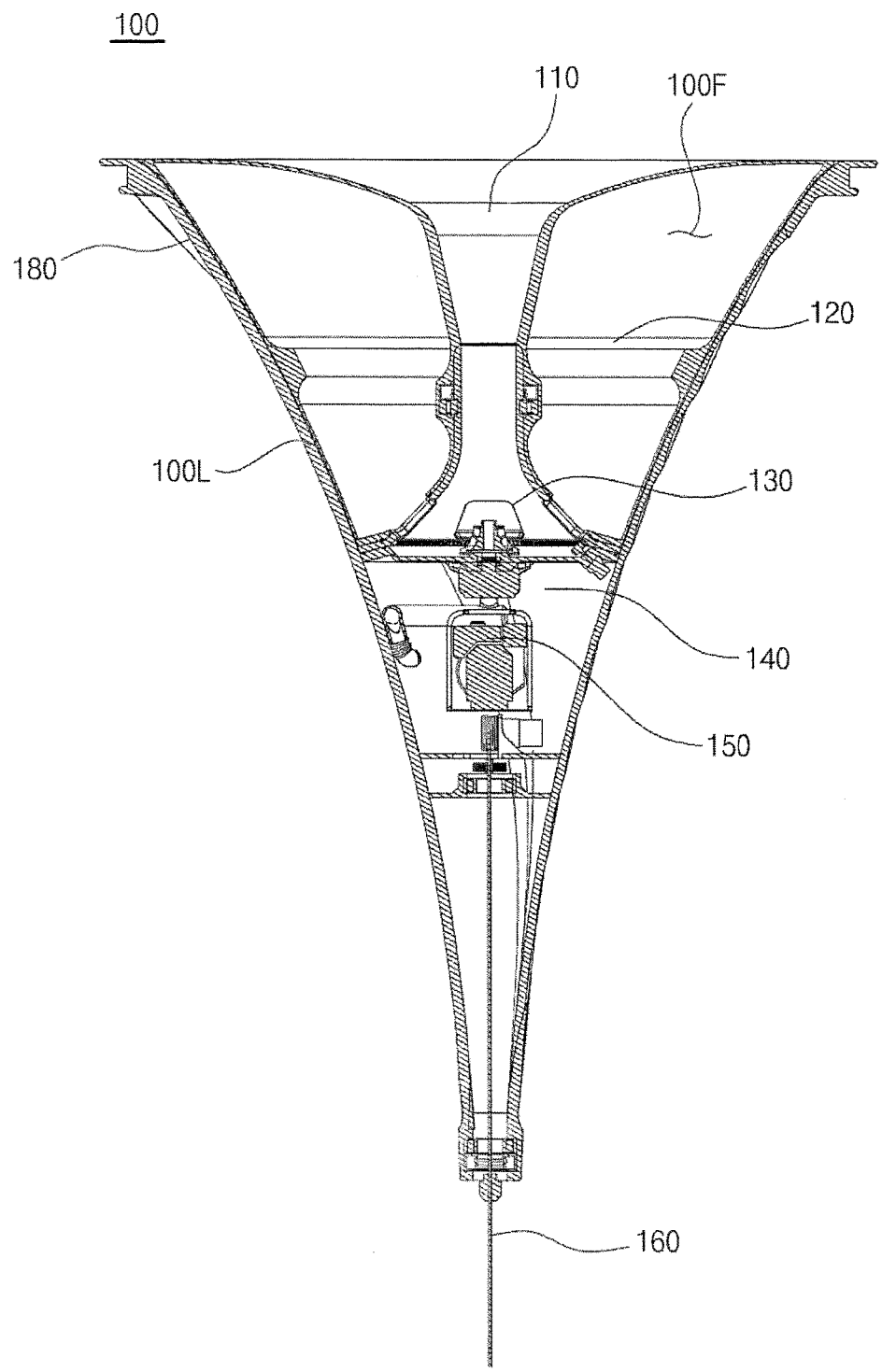
FIG. 2 is a cross-sectional view illustrating the system of FIG. 1.

FIG. 1 is a plan view illustrating a system for removing floating waste according to one embodiment of the present invention, and FIG. 2 is a cross-sectional view illustrating the system of FIG. 1.

With reference to FIGS. 1 and 2, a system for removing floating waste (hereinafter, also referred to as "floating-waste-removing system) 100 according to one embodiment of the present invention includes a storage filter support 100L and a storage filter 100F. The storage filter support 100L has a conical shape and is tapered to a lower end thereof. The storage filter 100F is inserted into the storage filter support 100L from above. The system may further include a pump 150 and an internal impeller 130 when a flow velocity is zero. The pump 150 is installed in the storage filter support 100L and discharges water outside. The internal impeller 130 is installed inside the storage filter 100F and moves floating waste to a storage portion of the storage filter 100. Alternatively, the system may further include an internal impeller 130 and a speed increaser 150' when the flow velocity is above zero. The internal impeller 130 is installed inside the storage filter 100F and moves floating waste to a storage portion of the storage filter 100F. The speed increaser 150' is installed in the storage filter support 100L and drives the internal impeller 130. Rotation of the pump 150 or speed increaser 150' causes a whirling vortex in river Wa in which floating waste S is present. As a result, the floating waste S is removed.

In the floating-waste-removing system 100 according to the present embodiment, the pump 150 draws in water of the river Wa, which is to be purified. At this time, a vortex is created due to gravity. Moreover, the internal impeller 130 rotates water in the to-be-purified river Wa, creating a vortex.

That is, the present invention features use of the internal impeller 130 and pump 150. In other words, by drawing in the floating waste with use of low energy by using the internal impeller and pump, it is possible to create a vortex by which the floating waste S floating on the surface of water can be effectively removed.

The floating-waste-removing system 100 illustrated in FIGS. 1 and 2 is a model to be used in a place where the flow velocity is zero. The floating-waste-removing system 100 includes the storage filter 100F, the storage filter support 100L, and a linear anchor 160 that is installed at a lower end portion of the storage filter 100L and that anchors the system 100 to the bed of the to-be-purified river Wa. The system 100 operates in this way to remove floating waste.

Respective parts of the floating-waste-removing system 100 according to the present embodiment will be described in brief below, and then a description on associations between the parts and operation/effect thereof will follow.

In the floating-waste-removing system 100 according to the present embodiment, the storage filter support 100L serves as a support member to support the storage filter 100F. The storage filter 100F is inserted into the storage filter support 100L from above.

The linear anchor 160 has an upper end that protrudes from the storage filter support 100L and a lower end that is fixed to the bed of the to-be-purified river Wa. That is, the linear anchor 160 serves as a fixing member.

In the floating-waste-removing system 100 according to the present embodiment, the pump 150 operates to draw in the water from the river Wa. At this time, a vortex is formed by gravity, so that the floating waste S floating on the surface of water is effectively removed.

Reference No. 140 is a buoyancy aid and a water-repelling portion that prevents water from entering into an operational portion. The buoyancy aid enables the system 100 to stably stand in place.

That is, the floating force of the system attributable to the buoyancy of the buoyancy aid 140 and the anchor's fixing force are offset, so that the system can be afloat and stably stand in place.

In the floating-waste-removing system 100 according to the present embodiment, the storage filter 100F includes an inlet 110, a storage portion 120 for storing collected floating waste, and the internal impeller 130.

The inlet 110 is at the topmost portion of the storage filter 100F and is an opening through which surface water and the floating waste are introduced into the storage filter.

The storage portion 120 is a space to store the floating waste. The storage portion 120 is filled with water right after the storage filter is installed. The floating waste S floats up by buoyancy and is then stored in the storage portion 120 of the storage filter 100F.

The internal impeller 130 induces a vortex, and the floating waste S spirals down to the bed of the river, scattering in all directions at the bottom of the river.

The internal impeller 130 creates a vortex at a place where the flow velocity is zero in order to scatter the floating debris in all directions. Meanwhile, the internal impeller may discharge water outside as well as create a vortex when the flow velocity is above zero.

Figure 3:
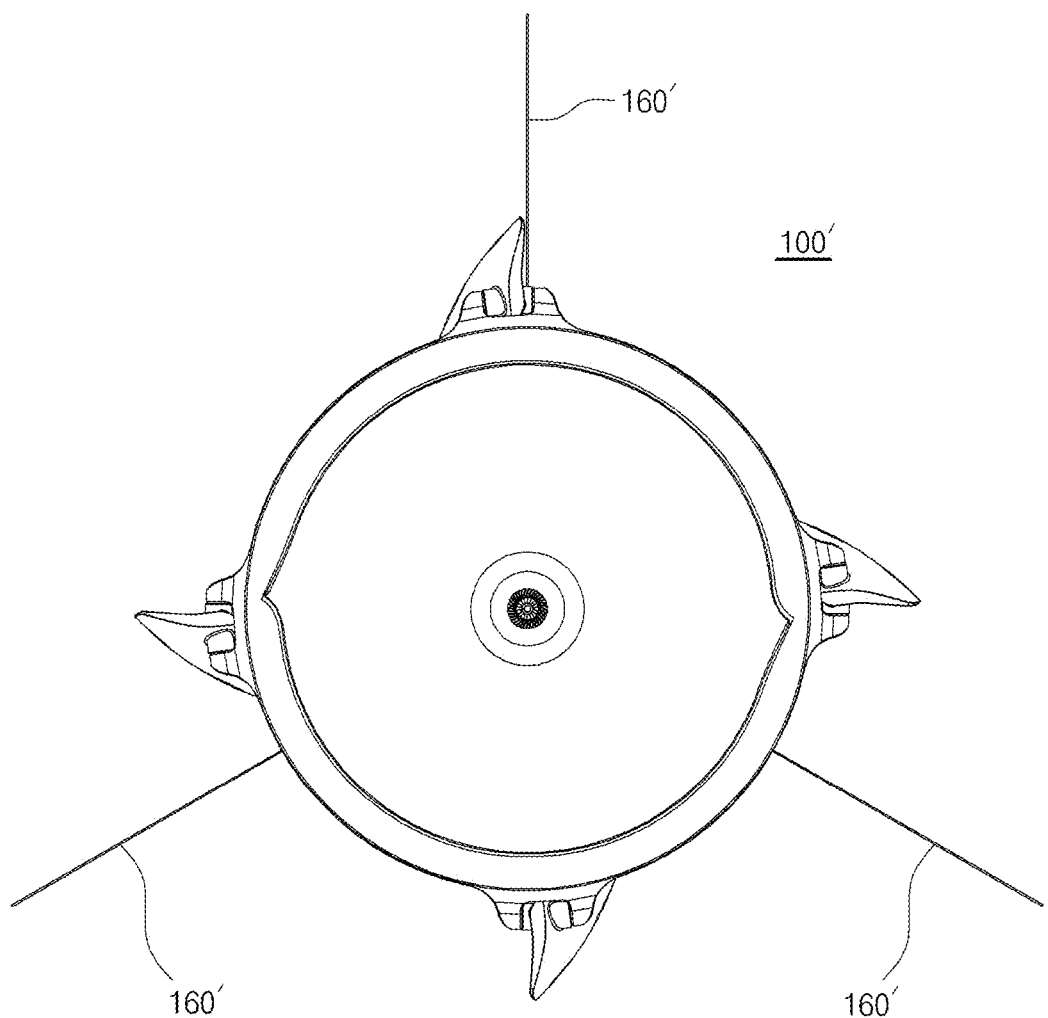
FIG. 3 is a plan view illustrating a system for removing floating waste according to an embodiment of the present invention.
Figure 4:
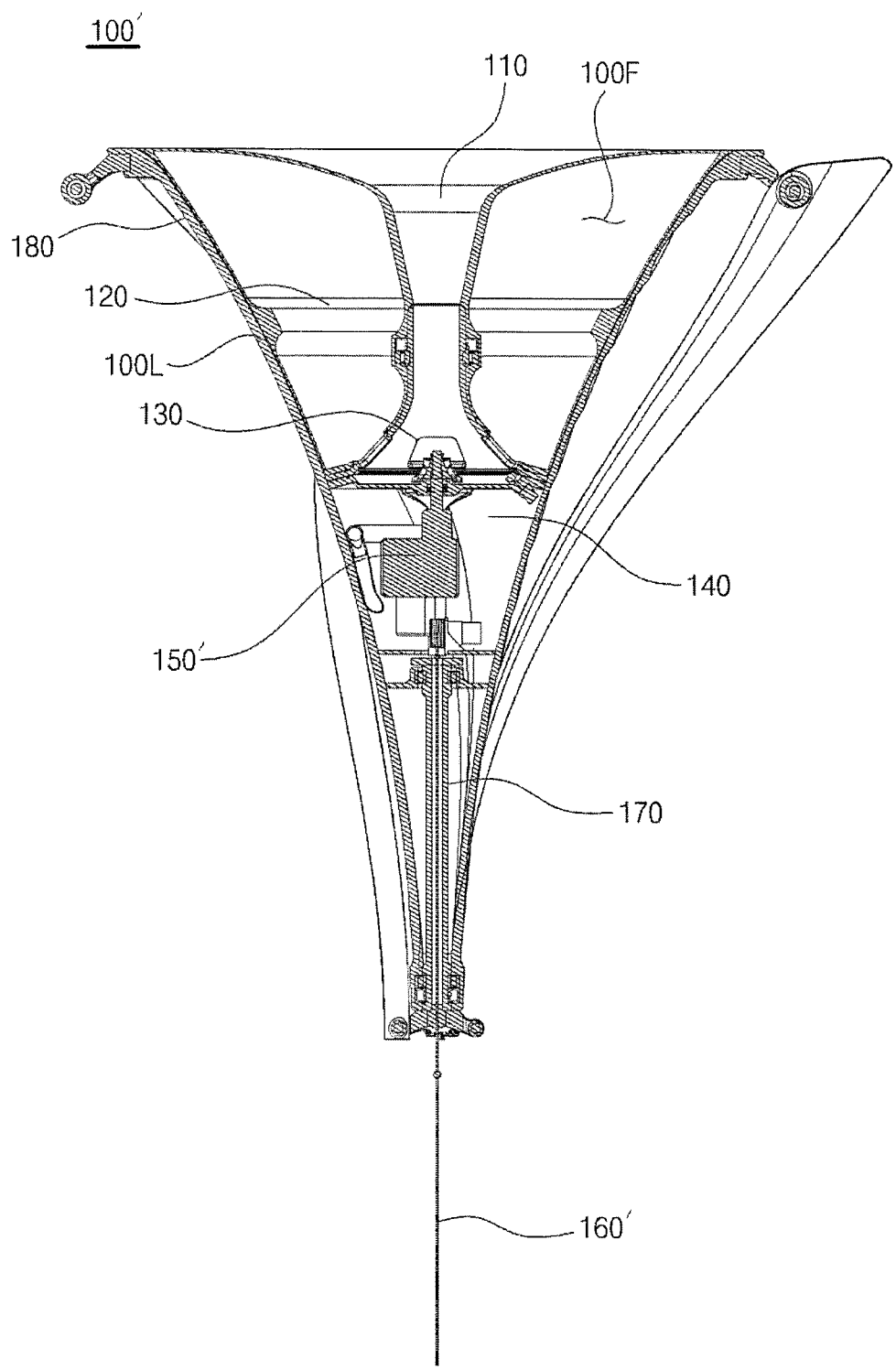
FIG. 4 is a cross-sectional view illustrating the system of FIG. 3.

FIG. 3 is a plan view illustrating a system for removing floating waste according to another embodiment of the present invention, and FIG. 4 is a cross-sectional view illustrating the system of FIG. 3.

The floating-waste-removing system 100 illustrated in FIGS. 1 and 2 is a model used in a place where the stream vortex is zero, but a floating-waste-removing system 100' illustrated in FIGS. 3 and 4 according to another embodiment of the present invention is used in a place where the stream vortex is above zero.

As illustrated in FIGS. 3 and 4, the floating-waste-removing system 100' according to another embodiment of the present invention features a speed increaser 150' and a multi-leg anchor 160' compared with the floating-waste-removing system 100 illustrated in FIGS. 1 and 2.

When describing the floating-waste-removing system 100', the description of the structure of the floating-waste-removing system 100 illustrated in FIGS. 1 and 2, which has been given above, will not be redundantly provided. Hereinafter, only the speed increaser 150' and multi-leg anchor 160' will be described.

The speed increaser 150' increases the operation of the impeller by mechanically transferring the rotational force received from an external turbine.

When the system 100' is installed in a place where the flow velocity is high, the multi-leg anchor 160' is structured such that the system 100' is kept standing in place even though there are the external forces attributable to the flow velocity and the rotational moment of a water turbine.

Figure 5:
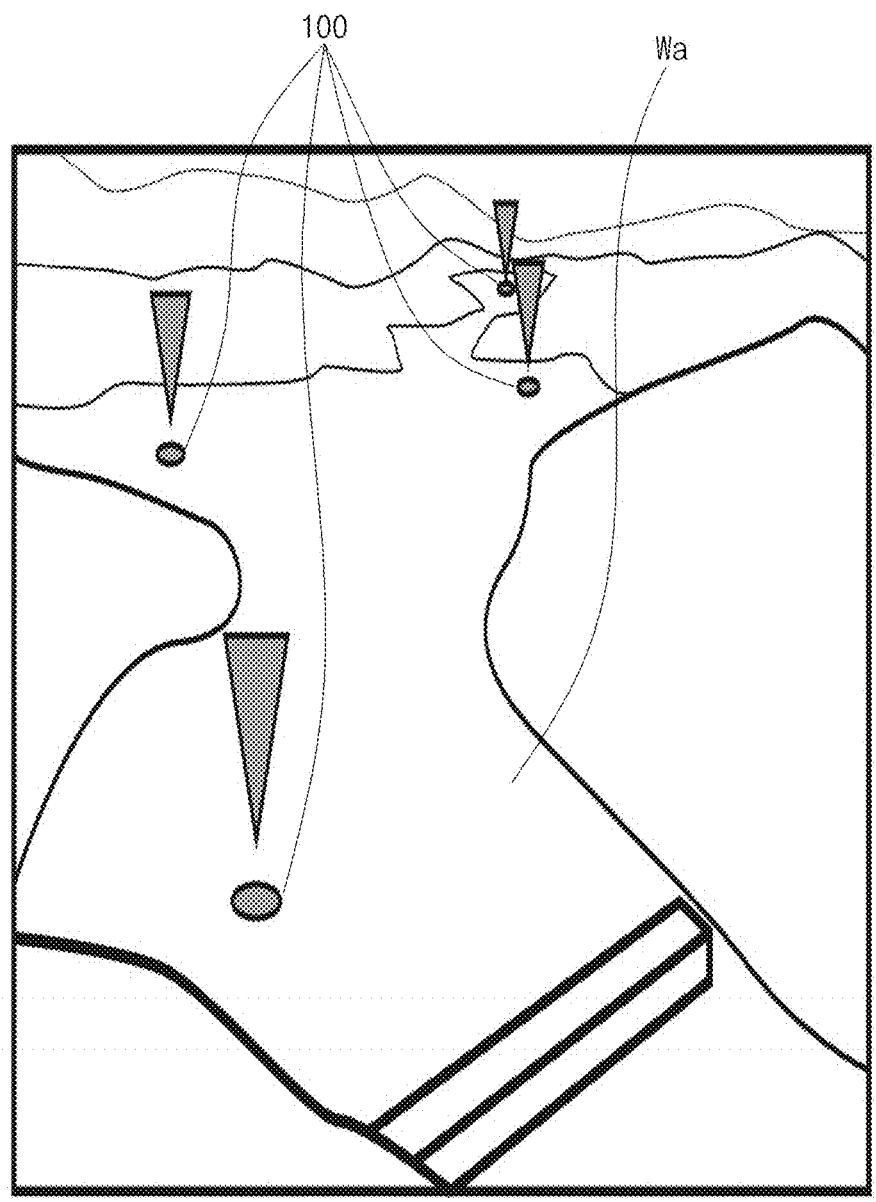
FIG. 5 is a schematic diagram illustrating a state in which a plurality of floating-waste-removing systems according to one of the embodiments is installed in a river in which a large amount of floating waste is present.
Figure 6:
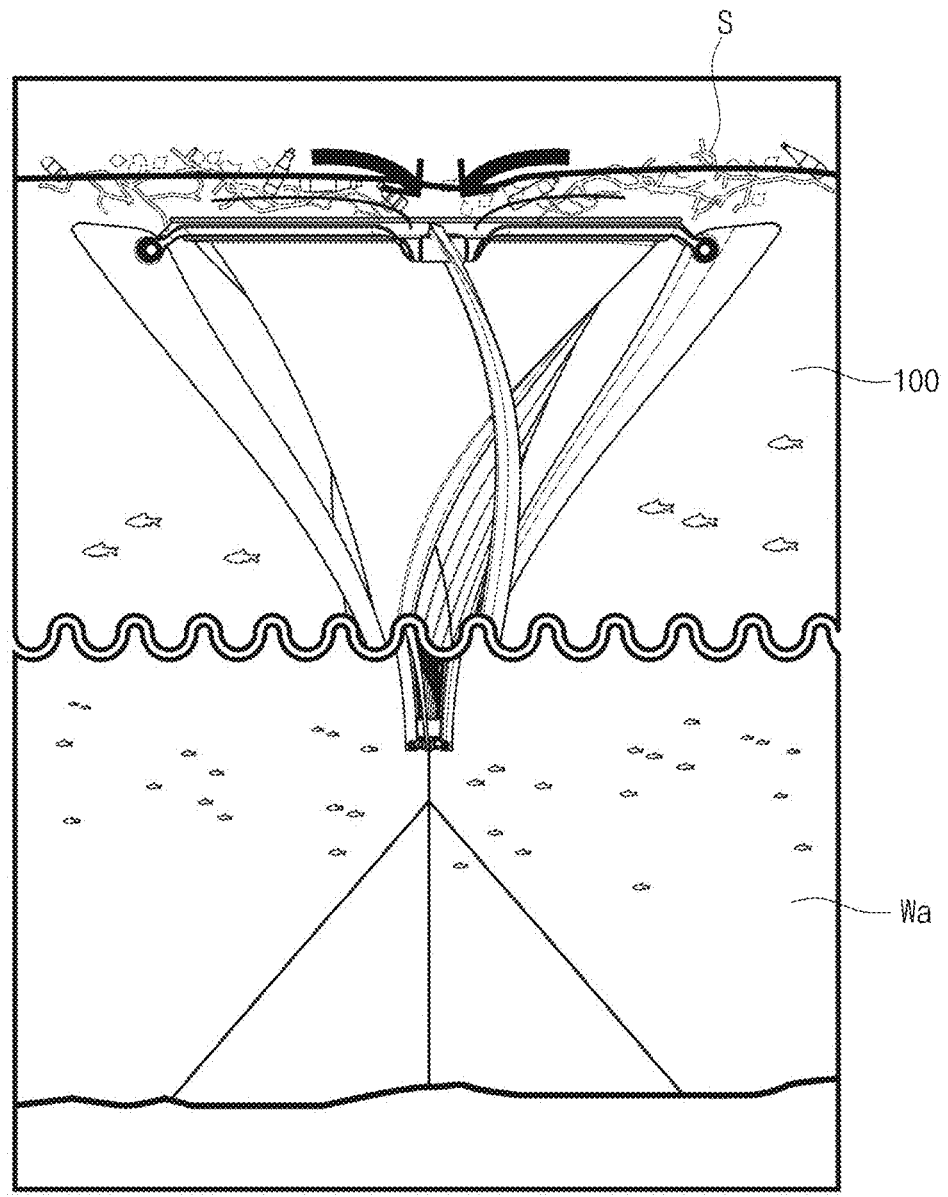
FIG. 6 is a schematic diagram illustrating a state in which a large amount of floating waste flows into a storage filter in the floating-waste-removing system according to an embodiment of the invention.

FIG. 5 is a schematic diagram illustrating a state in which a plurality of floating-waste-removing systems according to one of the embodiments is installed in a river in which a large amount of floating waste is present. FIG. 6 is a schematic diagram illustrating a state in which a large amount of floating waste flows into a storage filter in the floating-waste-removing system according to one of the embodiments.

Figure 7:
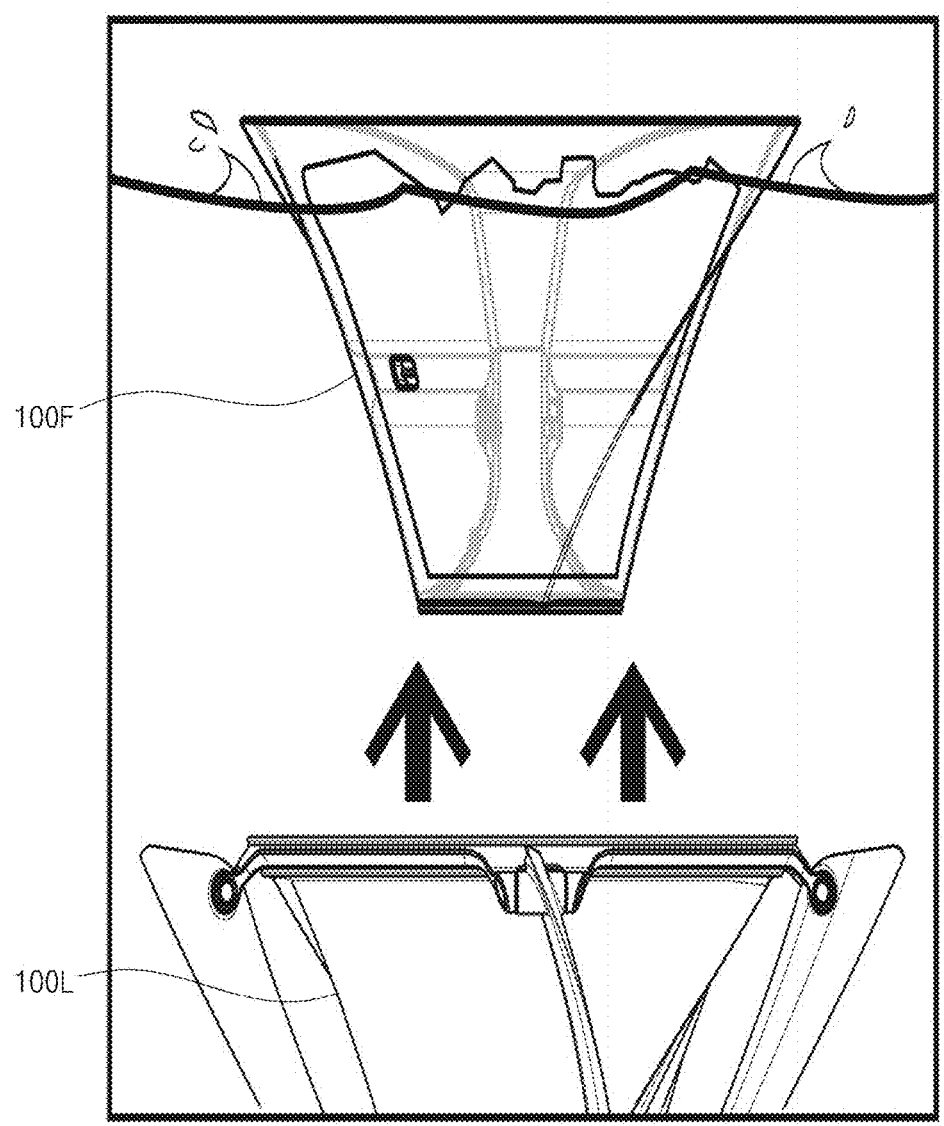
FIG. 7 is a diagram that shows an operation process in which a storage filter is detached from a storage filter support and rises to the surface of water by buoyancy when the storage filter of the floating-waste-removing system is filled with floating waste.
Figure 8:
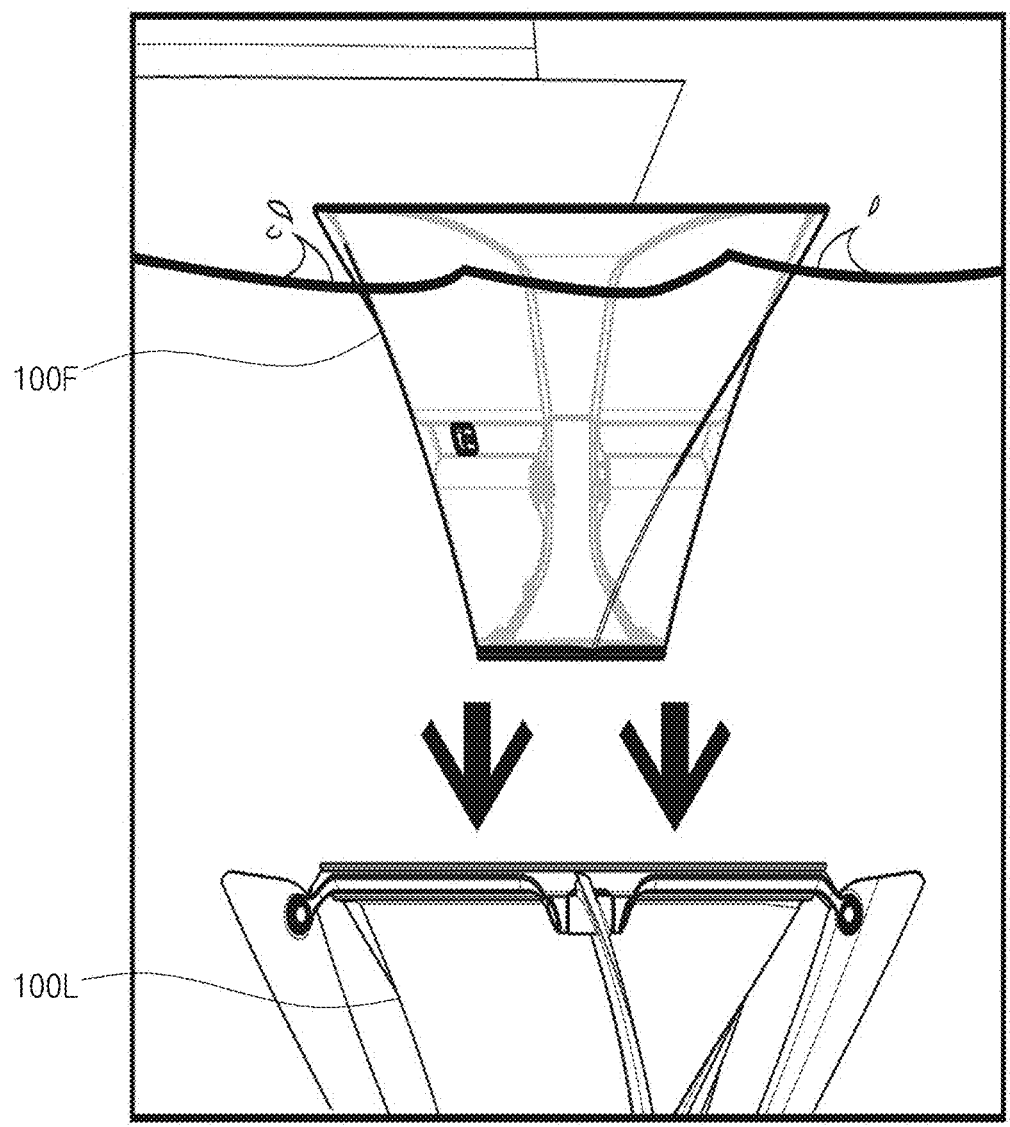
FIG. 8 is a diagram that shows an operation process in which a used storage filter is replaced with a new storage filter in the floating-waste-removing system according to an embodiment of the invention.
Figure 9:
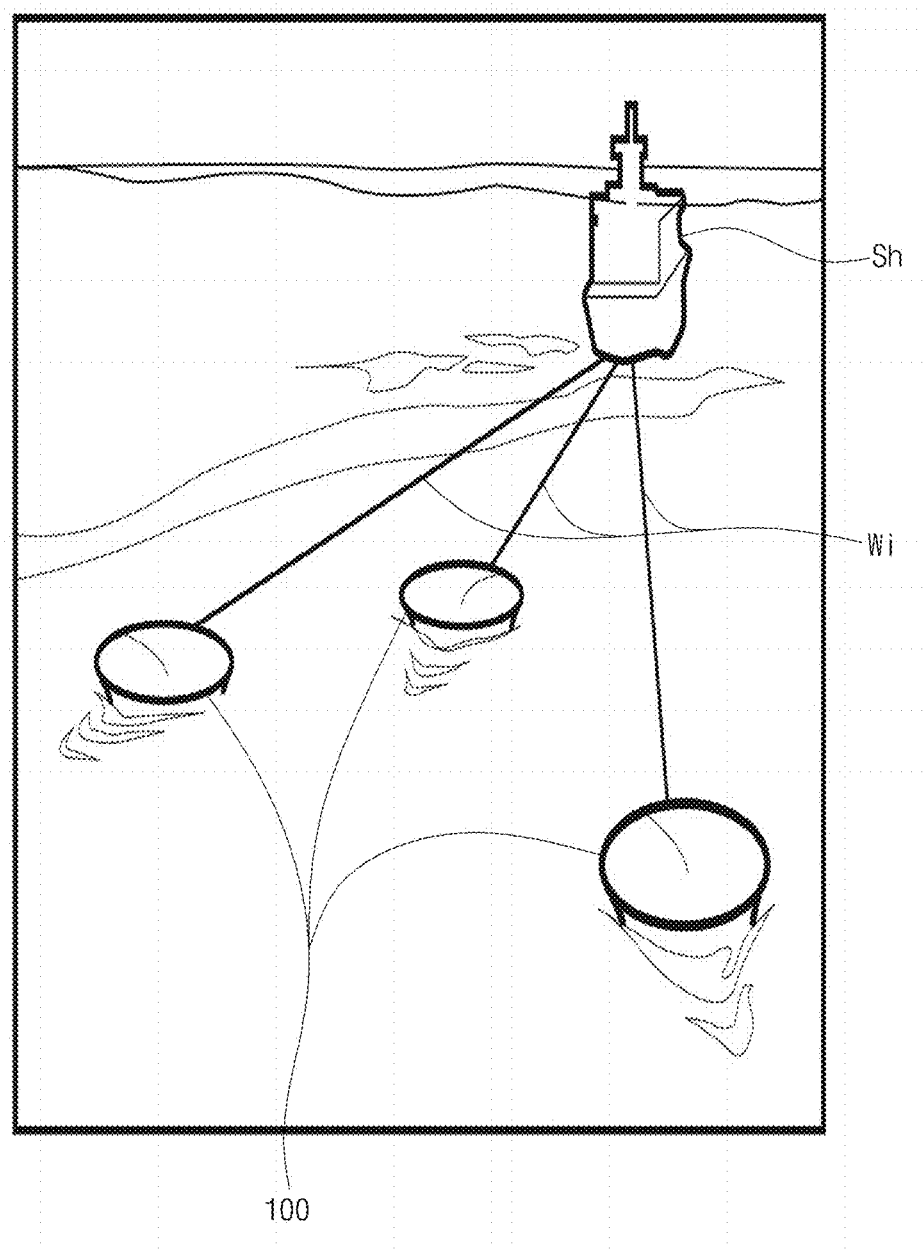
FIG. 9 is a diagram that shows an operation process in which a plurality of the floating-waste-removing systems according to an embodiment of the invention is tied using a towing rope so that the floating-waste-removing systems can be moved along the cleaning ship.
Figure 10:
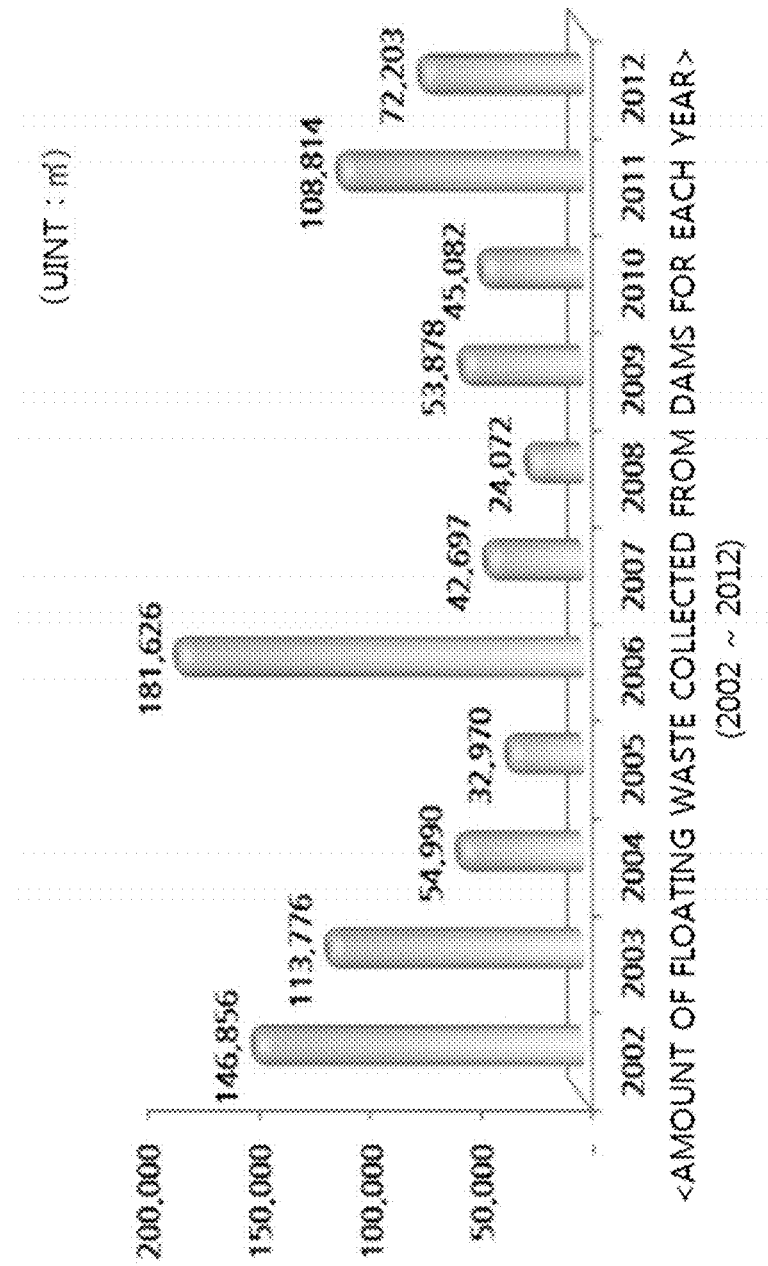
FIG. 10 is a graph showing the amount of floating waste per year.
Figure 11:
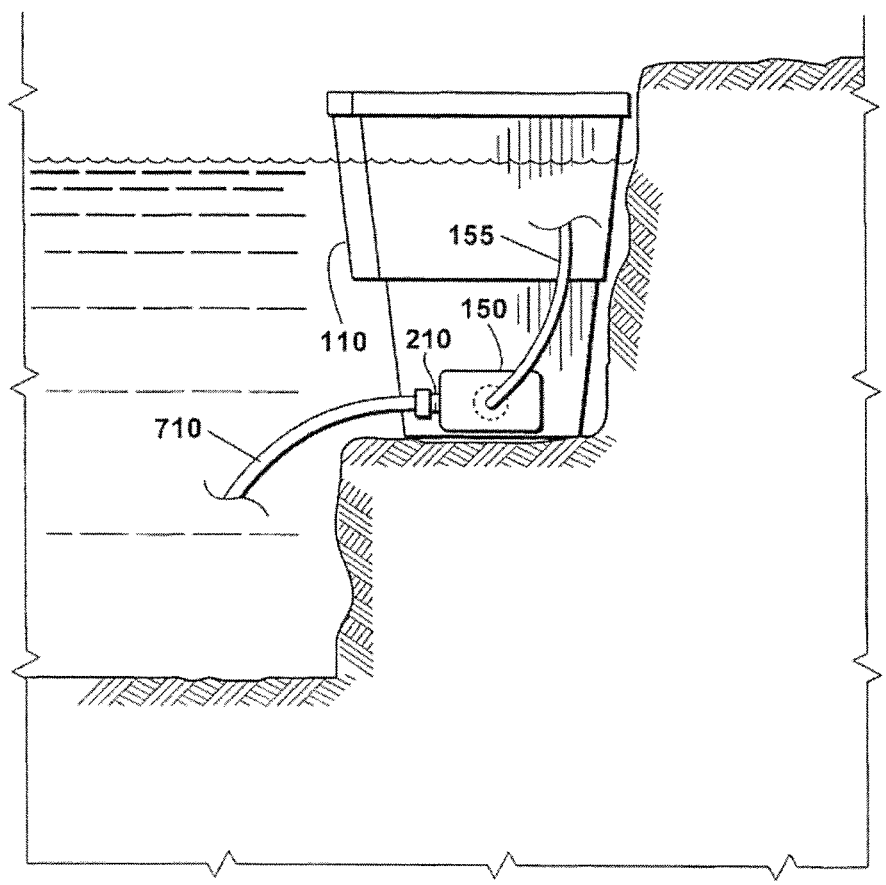
FIG. 11 is a schematic diagram illustrating an apparatus for removing floating waste according to a related art.
Figure 12B:
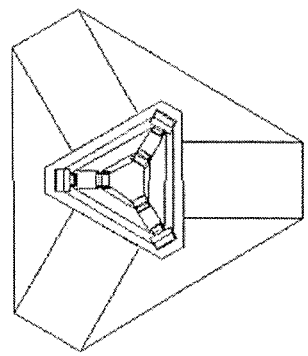
FIG. 12 A is a schematic diagram illustrating an apparatus for removing floating waste according to another related art.
Figure 12A:
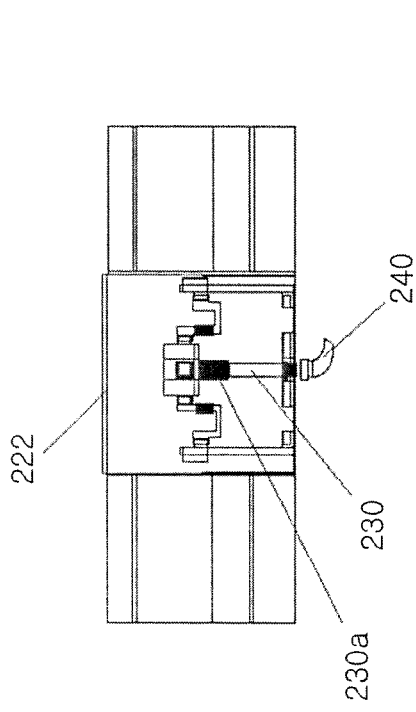

FIG. 7 is a diagram that shows an operation process in which a storage filter is detached from a storage filter support and rises to the surface of water by buoyancy when the storage filter of the floating-waste-removing system is filled with floating waste. FIG. 8 is a diagram that shows an operation process in which a used storage filter is replaced with a new storage filter in the floating-waste-removing system according to the present invention. FIG. 9 is a diagram that shows an operation process in which a plurality of the floating-waste-removing systems according to the present invention is tied using a towing rope so that the floating-waste-removing systems can be moved by the cleaning ship.

As illustrated in FIGS. 5 to 9, a method of removing floating waste (hereinafter, also referred to as floating-waste-removing method) using the floating-waste-removing system 100 or 100' includes: a step S110 of preparing the floating-waste-removing system 100 or 100' by inserting the storage filter 100F into the storage filter support 100L; a step S120 of tying more or more floating-waste-removing systems 100 or 100' to a cleaning ship Sh using towing ropes Wi to; a step S130 of towing the floating-waste-removing systems 100 or 100' using the cleaning ship Sh; a step S140 of anchoring the floating-waste-removing systems 100 or 100 to the bed of the river Wa using the linear anchor 160 or multi-leg anchor 160'; a step S150 of allowing water and floating waste S to be introduced into the storage filter 100F through the inlet 110 by driving the pump 150 or speed increaser 150'; a step S160 of detaching the storage filter 100F from the storage filter support 100L when the storage filter 100F is filled with the floating waste after long hours of operation of the system 100 or 100'; and a step S170 of replacing the detached storage filter 100F with a new storage filter 100F and recovering the used storage filter 100F.

The storage filter 100 has a separate storage portion 120.

When the storage portion is embodied in a module according to the kind of floating waste, the module may be used to effectively remove various kinds of floating waste as well as to remove solid floating debris.

The rest of the module except for a storage space is configured such that surface fluid can be effectively absorbed.

The storage portion may be embodied in a floating-waste-storing module suitable for removal of oil, green algae, red algae, etc.

The system and method for removing floating waste according to the present invention has an advantage of effectively removing floating waste while solving problems occurring in the related art.

The system for removing floating waste according to the present invention is embodied in a water purification robot that uses natural phenomena. The system uses the internal impeller 130 and the pump 150 or the speed increaser 150' to flexibly deal with various kinds of pollutants in water. Since the system can be anchored to the bed of a river Wa in which a large amount of floating waste is present on the surface of water by the anchor 160 or 160', the system can be installed wherever a large amount of floating waste S is present. Therefore, floating waste can be easily and effectively removed.

According to the system and method for removing floating waste according to the present invention, aside from the fact that the systems can be anchored to the bed of the river Wa in which a large amount of floating waste S is present and that the internal impeller 130, the pump 150, or the speed increaser 150' is used, the systems can be tied to an additional cleaning ship Sh using towing ropes so as to be moved by the cleaning ship Sh. Therefore, the system and method are effectively used to remove floating waste even when floating waste S is scattered over a large area.

According to the system and method for removing floating waste according to the present invention, aside from the fact that multiple systems 100 can be moved by the cleaning ship Sh, the following is possible. That is, when the systems are operated for long hours while being anchored to the bed of a river and thus the storage filters 100F, each of which is made up of the inlet 110, the internal impeller 130, and the storage portion 120, are filled with floating waste; the storage filter 100F is detached from the storage filter support 100L and floats by buoyancy. The used storage filters 100F are replaced with new storage filters and recovered to the cleaning ship Sh. Therefore, the used storage filters 100F can be reused many times after being cleaned. Therefore, cleaning of the river can be continuously performed using the systems.

The system and method for removing floating waste according to the present invention are also useful in removing green or red algae that occur in rivers or oceans, and that are social issues needing to be solved. Therefore, the system and method according to the present invention have an advantage of maintaining and sustaining a healthy ecological system.

Those skilled in the art will appreciate that the present invention can be embodied in different forms, without departing from the scope and spirit of the invention as disclosed in the accompanying claims.

Therefore the embodiments of the present invention are disclosed only for illustrative purposes and should not be construed as limiting the present invention.

The scope of the present invention is defined by the appended claims rather than in the above description above, and it is to be construed that various alternatives, modifications, equivalents and other embodiments may be included within the spirit and scope of the present invention as defined by the appended claims.

What is claimed is:

1. A system for removing floating waste, comprising:
   a storage filter support that has a conical shape and tapers from an upper end to a lower end thereof; and
   a storage filter received within the storage filter support and supported in an upper portion of the storage filter support,
   wherein,
   (a) the system further comprises a pump and an internal impeller in a case where the system is to be used in still water with zero velocity, the pump being installed in the storage filter support in order to discharge water, the internal impeller being installed inside the storage filter in order to move floating waste to a storage portion in the storage filter; or the system further comprises the internal impeller and a speed increaser, in a case where the system is to be used in moving water with a velocity that is not zero, the internal impeller being installed inside the storage filter in order to move floating waste to a storage portion in the storage filter, the speed increaser being installed in the storage filter support and driving the internal impeller; and
   (b) the pump or speed increaser is connected to the impeller and is located outside of the storage filter and within a lower portion of the storage filter support.

2. The system according to claim 1, wherein when the water is still water and the flow velocity of the water is zero, the pump and the impeller are rotated, causing a vortex.

3. The system according to claim 2, further comprising a linear anchor whose upper end is fixed to the storage filter support and whose lower end is fixed to the bed of a body of water.

4. The system according to claim 1, wherein when the flow velocity of the water is moving water and the water is above zero, the internal impeller installed inside the storage filter is rotated by a driving force of the speed increaser which is a driving means, causing a vortex.

5. The system according to claim 4, further comprising an anchor whose upper end is fixed to the storage filter support and whose lower end is fixed to the bed of a body of water at two or more positions.

6. The system according to claim 5, wherein the anchor is a multi-leg anchor that is fixed to the bed of a body of water in at least three positions.

7. The system according to claim 1, wherein the storage filter comprises:
   an inlet that is positioned at the top of the storage filter and through which floating waste and debris in the water can pass; and
   a storage portion that is filled with water right after the storage filter is installed and floats to the surface of the water by buoyancy of the floating waste when it is filled with the floating waste.

* * * * *